(12) United States Patent
Hartung et al.

(10) Patent No.: US 6,804,294 B1
(45) Date of Patent: Oct. 12, 2004

(54) METHOD AND APPARATUS FOR VIDEO FRAME SELECTION FOR IMPROVED CODING QUALITY AT LOW BIT-RATES

(75) Inventors: John Hartung, Warren, NJ (US); David Malah, Kiryat-Chaim (IL)

(73) Assignee: Lucent Technologies Inc., Murray Hill, NJ (US)

( * ) Notice: Subject to any disclaimer, the term of this patent is extended or adjusted under 35 U.S.C. 154(b) by 866 days.

(21) Appl. No.: 09/131,960

(22) Filed: Aug. 11, 1998

(51) Int. Cl.⁷ .............................................. H04B 1/66
(52) U.S. Cl. ............. 375/240; 375/240.12; 375/240.24; 375/240.02; 375/240.08; 375/240.18; 382/239; 382/238; 382/236
(58) Field of Search ................................ 348/384, 403, 348/404, 390; 382/239, 238, 236, 248, 251; 375/240, 240.12, 240.13, 240.14, 240.15–240.17, 240.02, 240.24, 240.08

(56) References Cited

U.S. PATENT DOCUMENTS

| | | | | |
|---|---|---|---|---|
| 4,183,087 A | * | 1/1980 | Huelsman | 364/515 |
| 5,057,921 A | * | 10/1991 | Robert et al. | 358/140 |
| 5,122,873 A | * | 6/1992 | Golin | 358/133 |
| 5,231,484 A | * | 7/1993 | Gonzales et al. | 358/133 |
| 5,265,180 A | * | 11/1993 | Golin | 382/56 |
| 5,650,860 A | * | 7/1997 | Uz | 348/390 |
| 5,778,192 A | * | 7/1998 | Schuster et al. | 348/384 |
| 5,878,166 A | * | 3/1999 | Legall | 348/384 |

OTHER PUBLICATIONS

Y. Wong; E. Viscito; E. Linzer, "Preprocessing of Video Signals for MPEG Coding by Clustering Filter," International Conference on Image Processing, pp. 129–132, 1995.

G. R. Arce; R. E. Foster, Detail–Preserving Ranked–Order Based Filters for Image Processing, IEEE Trans. Acoust. Speech, Signal Process., 37, pp. 83–98, 1998.

T. Viero; K. Oistamo; Y. Neuvo, "Three–Dimensional Median–Related Filters for Color Image Sequence Filtering," IEEE Trans. Circuits and Systems for Video Technology, 4, pp. 129–142, 1994.

(List continued on next page.)

*Primary Examiner*—Shawn S. An
(74) *Attorney, Agent, or Firm*—Kenneth M. Brown

(57) ABSTRACT

A method and apparatus for advantageously selecting video frames to be coded in order to improve the coding quality of a low bit-rate coder. In particular, temporal sub-sampling (i.e., selecting a set of frames to be coded from the complete incoming sequence of frames) is performed so that the frames which are to be coded are advantageously selected based upon a coding criterion, such as, for example, prediction gain (i.e., reduction in DFD variance). Specifically, in one illustrative embodiment, a larger number of frames are advantageously selected during periods of fast change, and correspondingly fewer frames are selected during other periods, while thereby keeping the overall apparent frame-rate fixed. The fixed frame-rate may, for example, be maintained by grouping the incoming sequence of frames into sequential groups of M consecutive frames, and then selecting exactly one frame per every M input frames, while permitting the selected frame to be at any advantageously selected location within the group of M frames. Thus, non-uniform frame selection is achieved, even though exactly one frame is actually coded within each superframe. Moreover, by basing the specific frame selection on an appropriate coding criterion (e.g., prediction gain), a substantial improvement in coder performance may be achieved for those critical portions of the video sequence during which a conventional coder's performance may be drastically reduced, without changing the apparent frame-rate.

28 Claims, 4 Drawing Sheets

OTHER PUBLICATIONS

M. K. Ozkan; M.I. Sezan; A.M. Tekalp, "Adaptive Motion–Compensated Filtering of Noisy Image Sequences," IEEE Trans. Circuits and Systems for Video Technology, 3, pp. 227–290, 1993.

R. P. Kleihorst; R. L. Lagendijk; J. Biemond, "Noise Reduction of Image Sequences Using Motion Compensation and Signal Decomposition," IEEE Trans. Image Processing, 4, 274–284, 1995.

J. S. Lee, "Digital Image Enhancement and Noise Filtering by Use of Local Statistics," IEEE Trans. Pattern Anal. Mach. Intell., 2, 165–168, 1980.

R. A. Peters, "A New Algorithm for Image Noise Reduction Using Mathematical Morphology," IEEE Trans. Image Process., 4, 554–568, 1995.

* cited by examiner

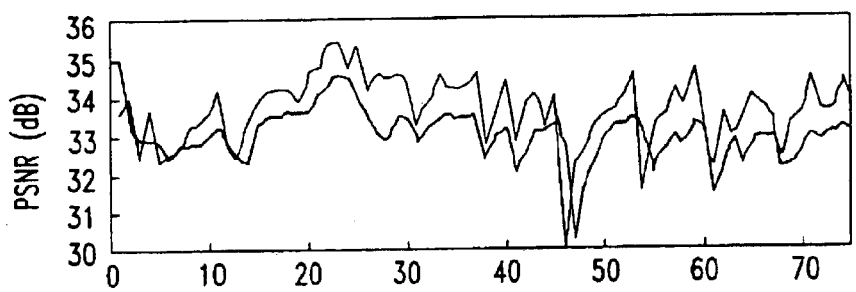
FIG. 6A
FIG. 6B
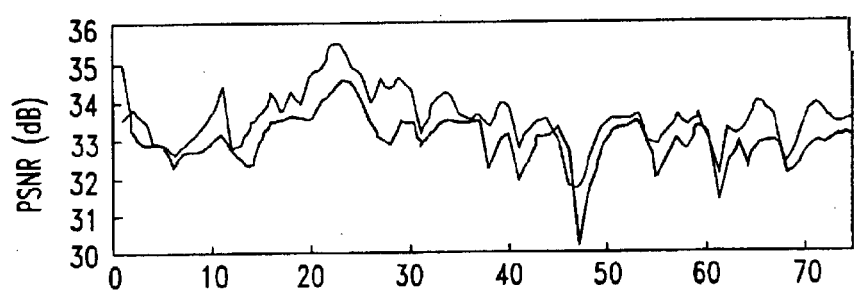
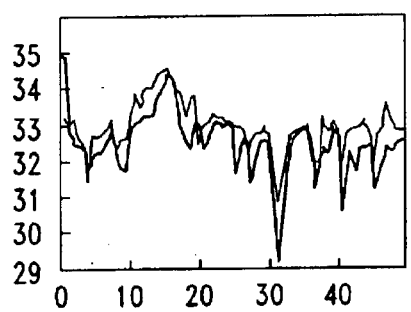
FIG. 7A
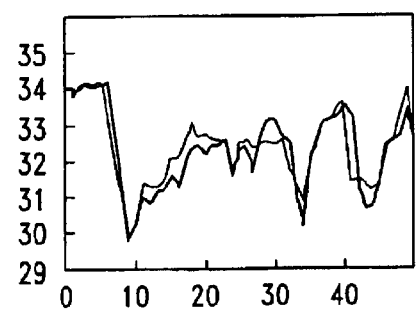
FIG. 7B
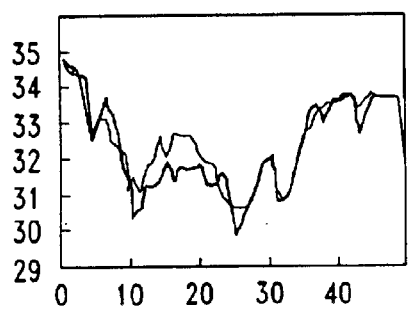
FIG. 7C
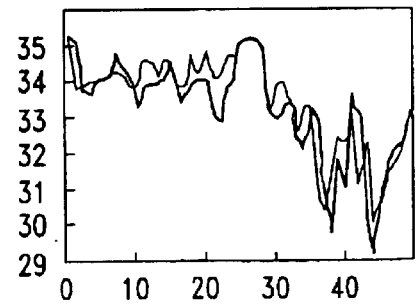
FIG. 7D

METHOD AND APPARATUS FOR VIDEO FRAME SELECTION FOR IMPROVED CODING QUALITY AT LOW BIT-RATES

FIELD OF THE INVENTION

The subject matter of the present application relates generally to the field of low bit-rate video coding and more particularly to a method and apparatus for advantageously selecting video frames to be coded for improved coding quality.

BACKGROUND OF THE INVENTION

Low bit-rate video coders are of great interest for a number of applications, including, for example, videophone, video-conferencing and multimedia applications. To achieve sufficiently low bit-rates, which for many of these applications must be as low as 16 Kbps (Kilobits per second) or even lower, both spatial and temporal sub-sampling is typically performed on the input signal prior to coding. Spatial sub-sampling is typically achieved by reducing the image size to QCIF (176×144 pixels) format (familiar to those skilled in the art). Temporal sub-sampling typically involves reducing the effective frame rate from 30 fps (frames per second) to 5–10 fps, or sometimes even below 5 fps. This effective frame rate reduction is typically obtained in conventional low bit-rate coders by selecting for encoding only every M'th frame from the input frame sequence (corresponding to a uniform frame selection and a temporal sub-sampling by a factor of M). Thus, for a coder which operates at 5 fps, for example, every sixth frame would be selected (i.e., M=6). At the decoder, the missing frames are usually filled-in by replicating the last decoded frame to obtain the nominal display frame-rate of 30 fps. Other techniques, such as, for example, motion-compensated frame interpolation (familiar to those skilled in the art) may also be applied at the decoder to supply the missing (i.e., uncoded) frames.

Even at such reduced spatial and temporal resolutions, however, the coding performance of standardized fixed rate coders, such as, for example, those in accordance with the "H.263" standard (hereinafter "H.263"), is often unsatisfactory during those portions of the video sequence in which a substantial change occurs between consecutively coded frames. ("H.263" is well known to those skilled in the art.) Such changes may be due either to a sudden increase in the motion of objects in the scene or to other fast scene changes.

The use of buffering, along with appropriate buffer control, has been used to address this problem to some degree. However, in real time applications such as videophone or video conferencing applications, the buffer size must necessarily be quite small, in order to avoid unacceptable delay. Thus, in a fixed rate regime, a sizable increase in motion or other fast changes in the scene results in a corresponding increase in the quantization step-size (i.e., a reduced coding resolution) in order to meet the fixed rate constraint, since the only way to code the substantial image change with the available number of bits is to code the data more coarsely. This reduced resolution typically causes an increase in blockiness (in block-based coders like "H.263") and other undesired effects, such as, for example, high frequency artifacts around edges, sometimes referred to as "mosquito noise." A partial remedy which has been applied to these degradations is to use postprocessing of the decoded video signal. Unfortunately, such postprocessing techniques often tend to introduce distortions, such as blurring, if heavily applied. Therefore, it may be more advantageous to improve the performance of low bit rate coders, and in particular the standard "H.263" coder, by appropriate processing of the video sequence prior to coding.

Prior art coding systems have in some cases applied such preprocessing techniques, but these preprocessors have addressed mainly issues of noise reduction and filtering prior to sub-sampling so as to avoid aliasing effects. Preprocessing has not heretofore been applied to the "clean" sub-sampled signal. Specifically, it would be advantageous to modify (or, equivalently, condition) the input signal such that the preprocessed, encoded signal will have fewer artifacts than would be introduced by coding the original input signal alone. Postprocessing may still be advantageously applied, but may be more moderately applied than might be otherwise needed. Such a combination of pre- and post-processing may therefore provide a substantial overall improvement in quality.

In particular, and as is familiar to those skilled in the art, hybrid coders such as "H.263" usually encode the displaced frame difference (DFD)—i.e., the difference between the current frame and a predicted frame, where the predicted frame is obtained using motion compensation on the previously coded frame. A direct consequence of this is that the coder performance will improve if the variance of the DFD is reduced. In other words, increasing the predictability of each frame to be coded from its motion-compensated predecessor necessarily improves overall coder performance. Although this result has been achieved to some extent in prior art coders by applying simple spatial filtering, such filtering techniques introduce significant perceived degradation of the image. It would be advantageous, therefore, to increase the predictability of the frames while causing minimal perceived degradation.

SUMMARY OF THE INVENTION

The present invention provides a method and apparatus for advantageously selecting video frames to be coded in order to improve the coding quality of a low bit-rate coder. In particular, it has been recognized that prior art coding systems' method of temporal sub-sampling (i.e., selecting a set of frames to be coded from the complete incoming sequence of frames) may be modified so that the frames which are to be coded are advantageously selected based upon a coding criterion, such as, for example, prediction gain (i.e., reduction in DFD variance).

Specifically, in accordance with the instant invention, a video signal comprising a sequence of video frames is coded, the sequence of video frames comprising a sequence of subsequences of said video frames, by (i) determining a coding quality measure for one or more of the video frames comprised in one of said subsequences of said video frames; (ii) selecting a particular one of the video frames comprised in said one of said subsequences of said video frames, the selection based on the coding quality measure therefor; and (iii) coding the selected video frame as representative of said one of said subsequences of said video frames.

Illustrative embodiments of the instant invention recognize that a noticeable reduction in conventional coder performance occurs whenever there is a fast change between consecutive coded frames (e.g., a sudden head tilt or hand waving in a typical videophone sequence). Therefore, in accordance with an illustrative embodiment of the present invention, a larger number of frames are advantageously selected during such short periods of fast change, and correspondingly fewer frames are selected during the other periods, while thereby keeping the overall apparent frame-rate fixed. In accordance with one illustrative embodiment of the present invention, the fixed frame-rate may be maintained by grouping the incoming sequence of frames into sequential groups of M consecutive frames, and then selecting exactly one frame per every M input frames, while permitting the selected frame to be at any advantageously selected location within the group of M frames. (Such a group of M sequential frames will be referred to herein as a "superframe"). In this manner, two consecutively coded frames may turn out to be as close as one frame apart in the original 30 fps input sequence, or may turn out to be up to 2M−1 frames apart. Thus, non-uniform frame selection is achieved, even though exactly one frame is actually coded within each superframe. Moreover, by basing the specific frame selection on an appropriate coding criterion (e.g., prediction gain), a substantial improvement in coder performance may be achieved for those critical portions of the video sequence during which a conventional coder's performance may be drastically reduced, without changing the apparent frame-rate.

BRIEF DESCRIPTION OF THE DRAWINGS

FIGS. 6A and 6B show coding quality improvement which results from an illustrative embodiment of the present invention which uses a power of the displaced frame difference (DFD) as a branch metric.

FIGS. 7A–7D show coding quality improvement which results from an illustrative embodiment of the present invention which uses the mean absolute difference (MAD) as a branch metric.

DETAILED DESCRIPTION

Overview of the Illustrative Embodiment

Figure 1A:
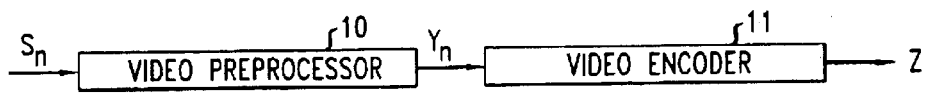
FIG. 1A shows a video encoding system employing a video encoder preprocessor which may be implemented in accordance with an illustrative embodiment of the present invention.

FIG. 1A shows a video encoding system employing a video encoder preprocessing system in accordance with an illustrative embodiment of the present invention. The system comprises video preprocessor 10 and video encoder 11. Video encoder 11 is a conventional video coding system which employs a coding algorithm such as H.263. Video preprocessor 10 performs preprocessing of the original input video signal and may be implemented in accordance with various illustrative embodiments of the present invention.

Figure 1B:
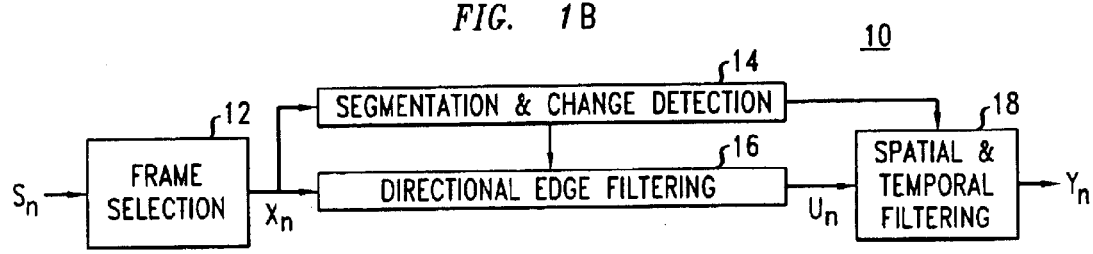
FIG. 1B shows a block diagram of a video encoder preprocessing system, such as the preprocessor of FIG. 1A, which includes video frame selection in accordance with an illustrative embodiment of the present invention.
Figure 2A:
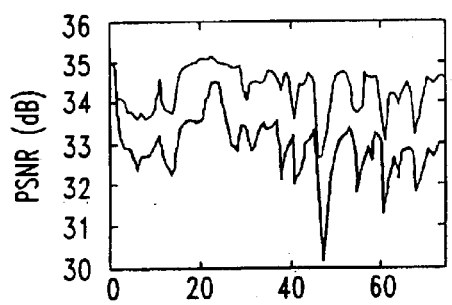
FIGS. 2A–2D illustrate, for four sample video sequences, both a typical performance degradation resulting from sudden motion of objects as experienced by a conventional video encoder, and illustrative improvements to the performance thereof which may be realized with use of a video encoder preprocessing system in accordance with an illustrative embodiment of the present invention.
Figure 2B:
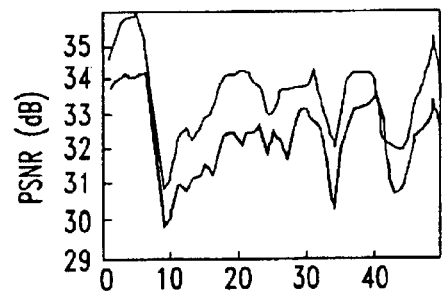
Figure 2C:
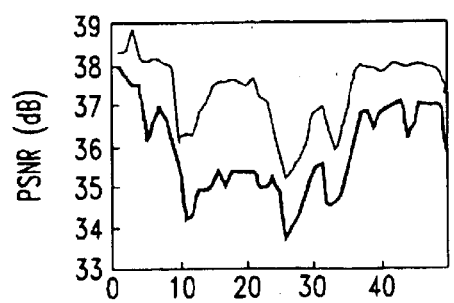
Figure 2D:
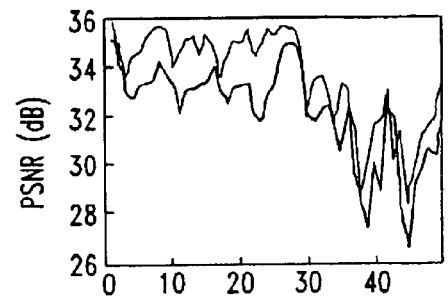

Specifically, a block diagram of a video encoder preprocessing system which includes video frame selection in accordance with an illustrative embodiment of the present invention is depicted in FIG. 1B. It contains four major blocks. The first major block, frame selection block 12, has the task of selecting the frames which will be coded from the incoming sequence of frames $\{S_n\}$, which arrive at a multiple of the coding rate (e.g., 30 fps), in accordance with an illustrative embodiment of the present invention. As explained above, to achieve low bit-rates, a much lower frame rate than 30 fps must should be advantageously utilized (e.g., 5–10 fps), and is typically obtained in conventional low bit-rate coders by selecting for encoding only every M-th frame from the input frame sequence (corresponding to a uniform frame selection, or uniform temporal sub-sampling by a factor of M). Thus, for a conventional coder which operates at 5 fps, every sixth frame is selected (M=6). At the decoder, the missing frames are typically replicated to obtain the nominal display frame-rate of 30 fps. Other techniques, such as motion-compensated frame interpolation, familiar to those of ordinary skill in the art, may also be applied.

Since a noticeable reduction in coder performance occurs whenever there is a fast change between consecutively coded frames (e.g, a sudden head tilt or hand waving in a typical videophone sequence), frame selection block 12 of the illustrative system of FIG. 1B advantageously aims to select more frames during such short periods, while nonetheless keeping the overall apparent frame-rate fixed. In accordance with one illustrative embodiment of the present invention, this can be achieved, for example, by constraining frame selection block 12 to select exactly one frame out of every consecutive group of M consecutive input frames, but nonetheless permitting the selected frame to be any of the M frames within the group. (Such a group of M consecutive frames will be denoted herein as a superframe.) In this manner, two consecutively coded frames could have been as close as one frame apart in the original 30 fps input frame sequence, or, alternatively, up to as many as 2M−1 frames apart. Therefore, non-uniform frame selection is advantageously achieved while the encoder is nonetheless fed with exactly one frame selected from each superframe. If the frame selection is performed in accordance with various illustrative embodiments of the present invention (some of which are described in detail below), a substantial improvement in coder performance can be obtained at those critical portions of the video sequence at which conventional coder performance is drastically reduced, without increasing the apparent frame rate.

FIGS. 2A–2D illustrate both a typical coder's performance degradation resulting from sudden motion of objects, and improvements thereto which may be realized with use of an illustrative embodiment of the present invention. In particular, the Peak SNR (PSNR) in dB for each frame in the corresponding illustrative coded sequence is shown for both a conventional coder (the lower curve) and for a coder whose input has been preprocessed in accordance with one illustrative embodiment of the present invention as shown in FIG. 1B. The sequences were coded with a particular version (TMN-5) of the H.263 coder, familiar to those skilled in the art, at the indicated bit rates. The coding frame rate for each of the four sequences shown is 5 fps. The bit rate for each sequence was chosen such that, on average, an acceptable performance is obtained.

In accordance with the principles of the present invention, the coding performance is advantageously improved via preprocessing, particularly where the standard coder has substantial (temporary) drops in performance, as can be seen from FIGS. 2A–2D. (See, for example, frame 47 of the sequence 'Manya' shown in FIG. 4A, frame 34 of the sequence 'Roberto' as shown in FIG. 4B, etc.) The upper curves in each subplot result from encoding the preprocessed sequences using the illustrative preprocessor of FIG. 1B employing, inter alia, the principles of the present invention. In particular, it is the inventive frame selection process of the illustrative preprocessor which mainly provides the illustrated improvement in performance where the conventional coder experiences the aforementioned temporary sharp drops in performance. (The remaining blocks of the illustrative preprocessing system of FIG. 1B apply a form of spatial-temporal adaptive filtering, familiar to those skilled in the art, which affects more uniformly the entire coded sequence.)

A variety of frame selection techniques may be employed in accordance with the principles of the present invention. A selected few of these are presented below, but many others will be obvious from the teachings herein to those of ordinary skill in the art. One possible basis for categorizing various ones of these frame selection techniques is to categorize such techniques based on the delay involved. That is, the possible delay ranges from 'long' (i.e., multi-superframe delay) to 'short' (i.e., one superframe delay) and even to no delay at all ('causal selection'). For the long-delay case, one illustrative technique looks for the 'best' L frames to be coded, out of an input sequence consisting of N=LM frames, under the given frame-rate constraint and by using a Viterbi algorithm, familiar to those skilled in the art, to determine the 'best path'. For the causal selection case (i.e., no delay as measured in superframes), one illustrative technique selects a frame for coding based only on the current and past superframes. Note that the long delay case is typically not suitable for real-time video telephony, but it could nonetheless be useful in low bit-rate storage applications, such as those considered in some multimedia applications.

The remaining blocks in the illustrative preprocessing system of FIG. 1B may be conventional. Segmentation and change-detection block 14, for example, first performs segmentation of each of the selected frames $X_n$. In the segmentation process each pixel in the frame may, for example, be classified as belonging to one of four categories, based on the pixels in its immediate neighborhood. Illustratively, the four categories are flat (or smooth), textured medium, textured high, and edge. In addition, block 12 also illustratively performs change detection on the basis of both the current selected frame $X_n$ and the previous frame $X_{n-1}$, so that each pixel in $X_n$ is labeled either as changed or unchanged. The above classification results are used in the remaining two blocks of the system to match the processing parameters to the type of each pixel, taking into account human visual system (HVS) characteristics pertaining to the different classes.

Directional edge filtering 16 in the illustrative preprocessing system of FIG. 1B performs spatial filtering of the current frame $X_n$ to produce the filtered frame $U_n$. The filtering may be advantageously limited to those pixels which are classified as edge pixels and also belong to the class of changed pixels as determined by the change detection unit. The filtering is done in the direction of the edge which goes through the pixel to be filtered, and hence the term directional edge filtering is used to describe this block in the illustrative system of FIG. 1B. Such filtering of changed (usually moving) pixels, when limited to a 3 point averaging, has been found to be unnoticeable by the observer yet usually increases further the predictability of the current frame from its predecessor. The improved predictability (i.e., reduction in DFD variance) is the result of reducing luminance fluctuation along edges. These fluctuations are not always well compensated by the block-based motion-compensation algorithm used in conventional coders, and hence appear in the DFD. This type of directional filtering is also advantageously applied directly to the DFD in spatial and temporal filtering block 18 of the illustrative system of FIG. 1B. described below, to further reduce its variance. The directional filtering is advantageously applied only to changed pixels to avoid affecting stationary (background) pixels, for which the eye is much more sensitive in detecting the filtering effects. In addition, the DFD values in unchanged (stationary) regions are small and do not significantly contribute to the DFD variance.

The final block in FIG. 1B, spatial and temporal filtering block 18 performs several operations. It implements a prediction loop (similar to that implemented in the H.263 standard, described in detail below), but without quantizing the prediction residual. The input frame to this block, $U_n$, is subjected to spatial and temporal filtering therein, through operations on the DFD frame. Specifically, the spatial filtering is advantageously performed only on edge pixels in the DFD, in the direction of the edge. For this purpose, as well as for the temporal filtering, the DFD frame is segmented into the same four categories used in the segmentation of frame $X_n$, as discussed above. The temporal filtering is performed by weighting each pixel in the DFD by a factor which varies both globally (from frame to frame) and locally, i.e., according to the classification of each pixel, both in the DFD frame and the input frame. The output of this block, $Y_n$, is the preprocessed frame, preprocessed, inter alia, in accordance with the principles of the present invention, to be fed to the encoder.

The preprocessed sequence $\{Y_n\}$ can advantageously be made almost perceptually transparent with respect to the original uniformly sub-sampled input frames. Nonetheless, it has a significantly higher correlation between consecutive frames (i.e., improved predictability), particularly at those critical instants of momentary fast changes. The improvement in predictability (up to 6 dB as determined in certain conducted experiments), results in improved coder performance of up to 3 dB (in PSNR) as can be seen in FIGS. 2A–2D.

A First Illustrative Embodiment of Frame Selection

As described above, the frame selection block of the illustrative preprocessing system of FIG. 1B has the task of selecting the frames to be coded from the incoming input frames (usually at the rate of 30 fps). Given a desired frame-rate reduction factor of M, the apparent frame-rate will remain fixed if exactly one frame is selected for each group of M input frames (i.e., for each superframe). In accordance with other illustrative embodiments of the present invention, the selection of successive frames may not be restricted to selecting one frame from each of a succession of superframes, but such a selection is usually preferred, even if a long delay is permitted, as will be explained further below.

In accordance with a first illustrative embodiment of frame selection, it is assumed that a long delay is permitted, as would be the case, for example, in storage applications. Thus, the decision of which frames to select can be made on the basis of an analysis of a long sequence of L>>1 superframes, i.e., of N=LM frames (in addition to the initial frame). (Other illustrative embodiments which may be advantageously employed when there are delay constraints, including when the selection must be causal—i.e., no delay at all, in terms of superframes—will be described below.)

Figure 3:
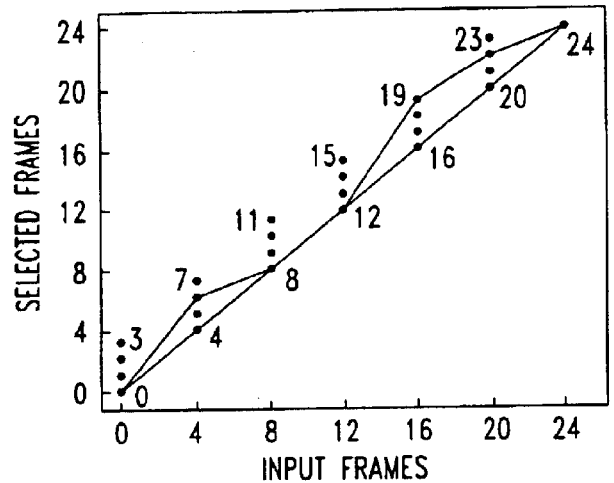
FIG. 3 shows a graph which illustrates the process of selecting one frame per each superframe in accordance with an illustrative embodiment of the present invention.

The problem of selecting a frame per each input superframe can, for example, be depicted as a path selection problem, as illustrated in FIG. 3. In particular, the size of a superframe (i.e. M) in the figure is illustratively 4. Note that in the figure, the input frame numbers are shown along the horizontal axis and the frame numbers which are selected are shown along the vertical axis. The diagonal thin line corresponds to a uniform frame selection in accordance with prior art techniques. That is, every M-th frame (i.e., frames 0, 4, 8 . . . ) is selected. The heavy line passing through frames 0, 6, 8, 12, 19, 22, 24 corresponds to a specific selection (path) which may be made in accordance with an illustrative embodiment of the present invention, wherein the selection advantageously satisfies the fixed frame-rate constraint. In particular, exactly one frame is selected from each (4-frame) superframe. Note that the group of frames from which the selection is made at any given step are marked in the figure by the heavy dots. In accordance with one illustrative embodiment of the present invention as illustrated in FIG. 3, each of these group of frames is also of size M (i.e., the size of a superframe), but this need not be the case in accordance with other illustrative embodiments of the present invention (see below). Also, note that in the illustrative example shown in FIG. 3, the selected frames get as close as one frame apart (such as, for example, frames 7 and 8) or are separated by up to 2M−1=7 frames (such as, for example, frames 12 and 19). Nonetheless, the video encoder which receives the output of the illustrative video encoder preprocessing system (including frame selection in accordance with the herein described illustrative embodiment of the present invention) will receive exactly one frame for each superframe of M=4 frames, as desired.

As demonstrated above, the fixed frame-rate constraint is met if the steps along the horizontal axis of an illustrative graph such as that shown in FIG. 3 are of size M each, and if only one frame is selected for each such step. However, in accordance with other illustrative embodiments of the present invention, more than M vertical dots at each horizontal position may be provided in each group (as opposed to exactly M, as shown in FIG. 3). Note that the set of vertical dots at each horizontal position indicates the group of frames from which a selection can be made at a given step. By including additional (e.g., more than M) dots, a richer selection is provided. In fact, and in accordance with one illustrative embodiment of the present invention, the entire sequence of remaining frames (i.e., up to input frame N) may be included at each horizontal position. Of course, in general, care should be taken to avoid a 'time-reversal'— i.e., selecting a frame number in a given step which precedes the frame number selected in the previous step. In other words, we advantageously impose a monotonicity constraint on the selected frame numbers. Another issue is that by adding more vertical dots in each step there is the possibility of selecting two frames in consecutive steps which are more than 2M−1 frames apart. Although not intrinsically a problem, this may cause excessive jerkiness in the coded sequence. Note that to reduce the jerkiness effect, in accordance with one illustrative embodiment of the present invention, less than M vertical dots (i.e., input frames) can be included at each step, but this tends to be advantageous only if M is large, such as, for example, when M>6, which is not common.

Figure 4:
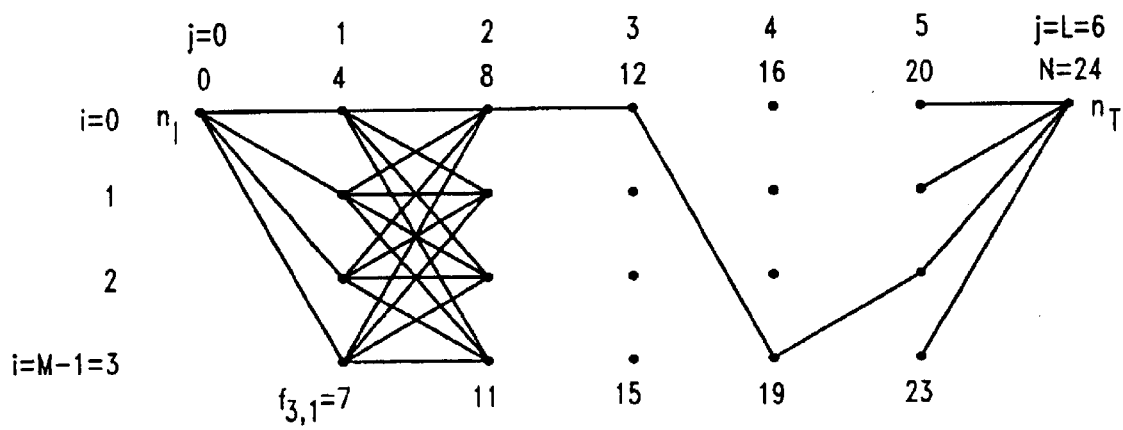
FIG. 4 shows an illustrative trellis corresponding to the illustrative graph of FIG. 3.

The question now is how to select a path in a given configuration with a given superframe size M. Advantageously, we wish to select the 'best' path, given the selection constraints. To determine what is meant by 'best', we advantageously define a distance measure, or local cost—i.e., a cost measure associated with the transition from a selected frame in the previous step to a frame in the current step (also known as a branch metric)—as well as a definition of a global cost (or path metric) associated with a given path. Then, in accordance with one illustrative embodiment of the present invention, the chosen (i.e., 'best') path will then be that path which results in the least global cost over all possible legal paths. To understand one approach to solving this problem, we first put the illustrative graph of FIG. 3 in the more convenient form of a fully connected trellis (except for the initial and terminal stages), familiar to those skilled in the art. Such a trellis corresponding to the illustrative graph of FIG. 3 is shown in FIG. 4. In this figure, each column between the initial and terminal nodes has M=4 nodes, corresponding to possible frame numbers which can be selected at each step. In the illustrative example shown, both the initial node ("0") and the terminal node ("N=24") are pre-set (i.e., fixed), but this need not be the case in general. That is, in accordance with other illustrative embodiments, any of frames 24 to 27 could serve as a terminal node, and any of the frames 0 to 3 could serve as an initial node, and the selection would still satisfy the fixed-rate constraint. If, as discussed above, we would allow the selection in each step to be from a larger group of frames than just the current superframe, we would have more nodes in each column. However, to avoid "time reversal" (i.e., to satisfy the monotonicity constraint) not all connections (transition from one node to the another) would be legal and the trellis will then not be fully connected. Alternatively, weights could be applied to each transition so that undesired transitions will get a very large weight, thereby heavily increasing their cost, and thus making their selection extremely unlikely.

Given the local and global costs (yet to be defined) and the trellis (and possibly some additional constraints on legal paths) the solution to the problem of determining the best path is well known to those skilled in the art and has been applied to a variety of problems, such as, for example, time alignment of utterances in speech recognition systems. One well-known solution technique is with the use of dynamic programming using the Viterbi Algorithm, familiar to those skilled in the art and further described below.

Determination of the Best Path

As is well-known to those of ordinary skill in the art, the Viterbi Algorithm (VA) provides an elegant, simple, recursive solution to best path determination problems. The solution is based in particular on Bellman's Optimality Principle, also familiar to those skilled in the art. This principal basically says that the if we have a node C on the best path from A to B, then the partial path from A to C is necessarily the best path to C (otherwise the whole path from A to B through C would not have been optimal), and, similarly, so is the partial path from C to B. This allows finding the optimal path through the trellis in a recursive manner, so that instead of examining all $M^N$ possible paths in our problem, for example, we need only to find the best M paths at any given stage (one path, the so called surviving path, to each node) which are recursively extended as we move from one stage to the next, as shown below.

To more fully describe the procedure, we adopt the following notation. Let j be the column (or stage) index (j=0, 1, ..., L=N/M), and let i be the index within a column (i=0, 1, 2, , ..., M−1) as illustratively marked in FIG. 4. According to this indexing convention, the frame number corresponding to node (i,j) is given by $f_{i,j}=i+jM$. Also, let d((k,j−1),(i,j)) be the local cost associated in traversing from node k in column j−1 to node i in column j. To simplify notation, this single step cost, or branch metric will be denoted as $d_j(k,i)$. Now, let $D_{j-1}(n_I,k)$ denote the cumulative (global) cost (or path metric) accumulated additively along the best (i.e., surviving) path from the initial node $n_I$ (corresponding to frame $f_{0,0}=0$) to node k in column j−1. Then, according to Bellman's optimality principle, we can find the best path from node $n_I=(0,0)$ to node (i,j), given the best path to each of the nodes in column j−1, by the following recursion:

$$D_j(n_I, i) = \min_{0 \leq k \leq M-1}[D_{j-1}(n_I, k) + d_j(k, i)] \quad (1)$$

where i=0, 1, ..., M−1, where k is the index to the nodes in column j−1, and where the minimization is repeated for each i in column j.

Figure 5:
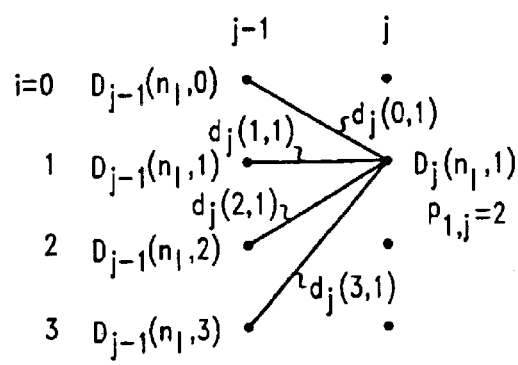
FIG. 5 shows an illustrative example of the process for selecting transitions within a trellis such as the illustrative trellis of FIG. 4.

Thus, in order to find the surviving path from the initial node $n_I$ to some node (i,j), given the surviving path to each of the M nodes in the previous column j−1, we need only to find that node in the previous column, for which the cost in the square brackets of the above expression is minimized. Denoting the index of that node by $p_{i,j}$ we have from Equation (1):

$$p_{i,j} = \arg\min_{0 \leq k \leq M-1}[D_{j-1}(n_I, k) + d_j(k, i)] \quad (2)$$

where i=0, 1, ..., M−1. As indicated in Equation (2), the determination of $p_{i,j}$ is performed for each of the nodes, i=0, 1, ..., M−1, in each column j. $p_{i,j}$ is therefore a pointer from node (i,j) to the node in the column from which the best path to (i,j) arrives. Thus, as the computation is performed, we have to store for each node only the accumulated cost of the survivor path from the initial node no to that node, and the pointer value which is just the index of the node in the previous column ($0 \leq p_{i,j} \leq M-1$), as can be seen in the illustrative example shown in FIG. 5. The heavy line in that figure is the selected transition from column j−1 to node (1,j)—i.e., it is the last segment of the surviving path from $n_I$ to (1,j).

When we get to the terminal node $n_T=(0,L)$, corresponding to frame $f_{0,L}=LM=N$, we obtain the total cost of the best path from $n_I$ to $n_T$, $D(n_I,n_T)=D_L(n_I,0)$. The path itself can be traced back using path pointers from the set $\{p_{i,j}\}$ computed in Equation (2), starting with terminal node $n_T$ and ending at the initial node $n_I$. In the illustrative example shown in FIG. 4, we begin at node (0,L)=(0,6) (corresponding to frame $f_{0,L}=N=24$), and follow the transition to the node pointed out by $p_{0,6}=2$, which is node (2,5) (or frame $f_{2,5}=22$), from which the pointer $p_{2,5}=3$ points to node (3,4) (frame $f_{3,4}=19$), and so forth, until we reach the initial node $n_I=(0,0)$ (frame $f_{0,0}=0$), pointed to in this illustrative example by pointer $p_{2,1}=0$. Note that uniform selection, as shown by the diagonal thin line in FIG. 3, corresponds to the top horizontal path (i=0; j=0, 1, ..., L) from $n_I$ to $n_T$ in FIG. 4.

Since the cost is being accumulated as we step from one stage of the trellis to the next, the total (global) cost of the best path from the initial node $n_I$ to the terminal node $n_T$ is given by:

$$D(n_I, n_T) = \sum_{j=1}^{L} d_j^* \quad (3)$$

where $d_j^*$ denotes the local cost between the node in column j−1 (on the surviving path to $n_T$) to the node in column j on the same path.

Branch Metric

To apply the above formulation to the problem at hand, namely, determining the sequence of frames to be coded, we need to define the branch metric (local cost) $d_j(k,i)$ associated with traversing from a node (k,j−1) to a node (i,j)—i.e., from frame $f_{k,j-1}$ to frame $f_{i,j}=i+jM$. In accordance with an illustrative embodiment of the present invention, one advantageous choice for a distance between frames, in the context of video coding, is the power of the displaced frame difference (DFD) between the two frames under consideration, obtained by performing motion compensation between the two frames, summing the squared differences of corresponding pixel values, and dividing by the number of pixels S in the image:

$$d_j^{dfd}(k, i) = \frac{1}{S}\sum_{l,m}[DFD(f_{i,j}, f_{k,j-1})(l, m)]^2 \quad (4)$$

where, $$DFD(f_{i,j}, f_{k,j-1})(l,m) = f_{i,j}(l,m) - f_{k,j-1}(l+v_l, m+v_m) \text{tm} \quad (5)$$

with $v_l$, $v_m$, being the coordinates of the offset vector at pixel (l,m) due to motion, and where the summation is performed over all the pixels in the image.

As shown in FIG. 6A for a video sequence which will be referred to herein as "Manya", the coding of the frames selected in accordance with the above-described illustrative embodiment of the present invention using the $d^{dfd}$ branch metric, resulted indeed in a PSNR improvement for most frames—increasing the average PSNR by 0.65 dB, and reducing the mean quantization step from 11.2 to 10.3. Note, however, that at those frames where there is an abrupt drop in PSNR because of momentary fast motion, the improvement is quite modest. In addition, by examining which frames were selected, it can be seen that there are many instances where adjacent frames in the original 30 fps were selected, followed by jumps of up to 2M−1=11 frames. This causes a somewhat 'jerky' display of the reconstructed sequence. Similar results were obtained for the other examined sequences.

It can be seen from the above-described simulation results, that with the given branch metric the frame selection algorithm is not putting enough emphasis on reducing large momentary drops in PSNR. It would thus be advantageous therefore to give more emphasis to the local performance. We have found that taking the square of the metric in Equation (4) provides the desired effect of giving more emphasis in the path-cost minimization to reducing momentary large drops, as is desired. This can be seen in FIG. 6B, for the same sequence "Manya," using $d = d^{sq-dfd} = [d^{dfd}]^2$ as the branch metric. It can be seen in particular that a meaningful improvement is advantageously obtained particularly where it is needed most. At frame 47 the improvement is almost 1.5 dB (just as a result of the inventive frame selection without any filtering applied to the input sequence), while on average the improvement in PSNR is about 0.5 dB. As can be seen with reference back to FIGS.

2A–2D, the additional blocks in the preprocessing system add another 1.5 dB improvement almost uniformly, so at frame 47 the overall improvement reaches almost 3 dB in PSNR.

In accordance with another illustrative embodiment of the present invention, the complexity involved in using DFD-based branch metric may be advantageously reduced. Note that the main computational load is in performing $M^2$ full frame motion computations in stepping from one column of the trellis to the next. From the examination of the variation of the DFD power along the different sequences, in comparison to the power of the plain Frame Difference (FD) and the Mean Absolute Difference (MAD), it can be seen that all three have large peaks at those locations were the PSNR is low. Thus, it may be advantageous to consider the use of local-cost measures which are based on either the FD power or the MAD. The reduction in computation as compared to computing the DFD could be up to three orders of magnitude, since motion compensation is not required.

Formally, the FD is given by:

$$FD(f_{i,j}, f_{k,j-1})(l,m) = f_{i,j}(l,m) - f_{k,j-1}(l,m) \qquad (6)$$

Thus, substitution of the FD of Equation (6) into Equation (4), in place of the DFD, results in the basic FD-based branch metric:

$$d_j^{fd}(k, i) = \frac{1}{S} \sum_{l,m} [FD(f_{i,j}, f_{k,j-1})(l, m)]^2 \qquad (7)$$

Similarly, the MAD-based metric is given by:

$$d_j^{mad}(k, i) = \frac{1}{S} \sum_{l,m} |FD(f_{i,j}, f_{k,j-1})(l, m)| \qquad (8)$$

Using the metrics of Equations (7) and (8) in simulations, similar results were obtained to those obtained with the DFD-based metric of Equation (4). That is, improvement of the average PSNR (when the selected frames are encoded) resulted, but a lack of improvement at those frames in which there are momentary big drops in performance was also found. Again, the use of the square and higher powers of the basic metrics proves advantageous, and indeed very similar results to those obtained with $d^{sq\text{-}dfd}$ were obtained when the square and the fourth power of the measures in Equations (7) and (8) were used. On average, over the several examined sequences, an advantage was found in using the fourth power, with a small preference to the MAD-based metric over the FD-based one. Hence, in accordance with one preferred embodiment of the present invention, the branch metric chosen for the frame selection algorithm is the fourth power of the metric of Equation (8), i.e., $$d = d^{qmad} = [d^{mad}]^4 \qquad (9)$$

The PSNR performance obtained by just applying frame selection, using this particular illustrative metric, to the same four sequences as shown in FIGS. 2A–2D, are shown in FIGS. 7A–7D. (Note that he frames in FIGS. 2A–2D were also selected with this metric, but those figures show the final results, i.e., those obtained by also performing spatial-temporal filtering of the selected frames.)

Reduced Delay Configurations

In the above discussion it was assumed that the whole image-sequence is given and is analyzed to find an optimal frame selection under the assumed trellis configuration. In practice the sequence can be very long and it is more practical to consider a segment of $N_S = L_S M + 1$ frames at a time, where M is the number of frames in a superframe and the number of stages in the trellis of each segment is $L_S+1$ (corresponding to j=0, 1, 2, . . . , $L_S$, as depicted, for example, in FIG. 4 for $L_S$=L ). The above frame selection method can then be applied to each segment separately, with the initial frame of the m-th segment, $n_I(m)$, set equal to the last frame of the previous segment, $n_T(m-1)$. Of course, $L_S$ (and hence $N_S$) need not be fixed and can vary with m.

Such a selection of frames will typically result in some increase in the overall cost, as compared to analyzing the whole sequence without segmentation. Yet, the results can be made closer to the optimal case if, for each segment m, the traced path in it is used only from $n_I(m)$ (in stage 0 of the m-th segment) up to stage $L_S - r > 0$ (recall that the path is found by tracing back the pointers $\{p_{i,j}\}$ from the last frame $n_T(m)$ which is in stage $L_S$ of that segment, to frame $n_I(m)$ in stage 0). The next segment, of length $N_S$, begins then at stage $L_S - r$ of the last segment, i.e., $n_I(m+1) = n_I(m) + (L_S - r)$ M. In both approaches a delay of $L_S - 1$ superframes is involved.

While in storage applications a long delay is of no consequence, it may not be tolerated in real-time applications, such as, for example, in video-conferencing. Therefore, in accordance with other illustrative embodiments of the present invention, different approaches to frame selection are advantageously employed under low-delay constraints.

Single Superframe Delay

A single superframe delay would result if the above segmentation mechanism were used with $L_S$=2, either with r=0 or with r=1, as can be seen below. Considering the case $L_S$=2, r=0, the diagram shown in FIG. 4 is reduced (for each segment) to the form shown in FIG. 8A. FIG. 8B then shows the way the concatenation of several segments may be performed, with the last frame in each segment serving as the first frame in the next segment. To select the best path in a simple diagram like the illustrative diagram shown in FIG. 8A, there is no need to use the Viterbi algorithm. This is because we have here a degenerated trellis with only M possible paths—one through each node of the center stage ($j_m$=1), as shown in the figure. The remaining issue is the selection of the branch metric. Based on the results described above, we use at first the branch metric $d^{qmad}$ of Equation (9) (which is derived from the MAD-based metric in Equation (8)). However, by taking a high power of the metric in Equation (8), we are basically aiming at selecting the path which minimizes the maximum of the two MAD values along the path. Accordingly, we advantageously define the global cost $C^i$ of a path from $n_I$ to $n_T$ through a node i in the center stage as the maximum of the metrics of the two branches between the input and output nodes, (see FIG. 8A), i.e., $$C_m^i(n_I, n_T) = \max(d(n_I(m), i), d(i, n_T(m))) \qquad (10)$$

where i=0, 1, . . . , M−1, and where m denotes the segment index and d denotes the branch metric (either $d^{mad}$ of Equation (8) or $d^{fd}$ of Equation (7)).

Figure 8A:
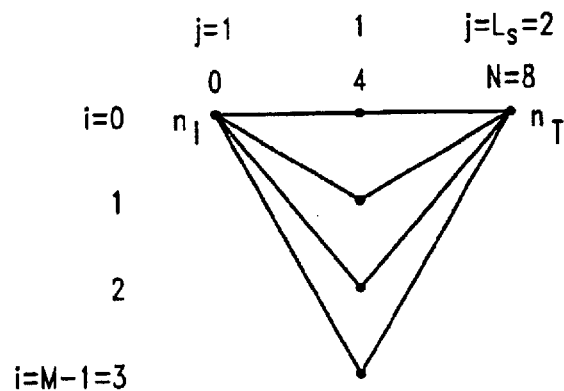
FIG. 8A shows a portion of a simplified trellis which may be used in accordance with an illustrative embodiment of the present invention which performs frame selection on a segmented basis.
Figure 8B:
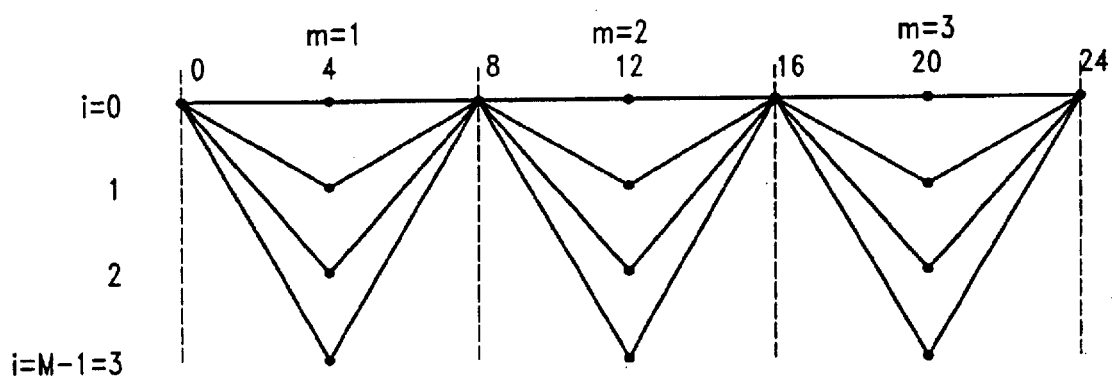
FIG. 8B shows a concatenation of several such trellis portions.

The optimal path in the illustrative diagram of FIG. 8A may therefore be determined by the index of the node in the center stage for which $C_m$ in Equation (10) is minimized. This index can be expressed via the pointer $p_{0,2}(m)$ in the earlier terminology (with the addition of the segment index m). To simplify notation we denote here this index by $p_m$, which is given by, $$p_m = \operatorname{argmin}_{0 \leq i \leq M-1} (C_m^i(n_I, n_T)) \qquad (11)$$

For illustrative purposes, the heavy lines in FIG. 8A and FIG. 8B indicate the best paths.

Heuristic Frame Selection

In accordance with another illustrative embodiment of the present invention, a heuristic technique may be employed for selecting the frame sample interval, wherein the technique advantageously has both low delay and low complexity. Although it may not provide an optimal selection of frames, it is suitable for software implementation in collaborative applications which cannot tolerate a sampled frame delay. In the previous sections frame selection was based on metrics calculated between all pairs of frames in two superframes. For superframes containing M frames each, therefore, $M^2$ metrics were calculated. A frame delay was also introduced, since at least the succeeding superframe needed to be received in order to calculate these metrics.

The instant heuristic technique makes the assumption that correlation between frames is proportional to their sampling interval, and that it is approximately linear over a superframe. In order to maintain constant quality over the sequence for constant frame and bitrate, it is advantageous to maintain a constant quantization stepsize, which is proportional to the previously defined metrics, such as, for example, the mean absolute frame difference (MAD) or, more correctly, the mean absolute difference of the motion compensated frame (DFDMAD). Since results indicate that the MAD performs about as well as DFDMAD for frame selection, MAD is advantageously chosen since it requires far lower complexity. The instant technique uses the MAD calculated between the beginning and ending frame of each superframe to determine the sampling interval for that frame. In accordance with the illustrative embodiment of the present invention, an empirically determined approach for determining the sampling interval works as follows:

1) calculate the MAD between the original frames at the current and previous samples.
2) if $MAD_{current} > MAD_{previous}$ shorten the sample interval by one frame.
3) if $MAD_{current} < MAD_{previous}$ lengthen the sample interval by two frames.

Figure 9:
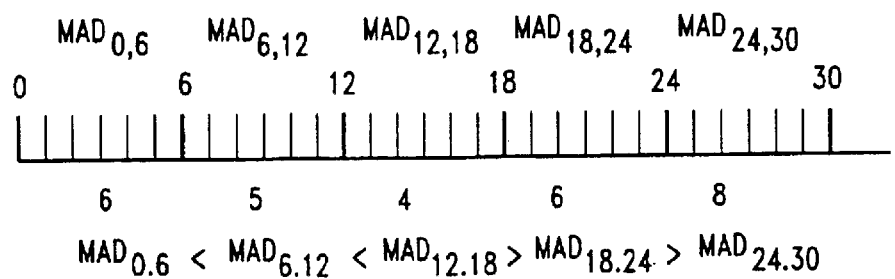
FIG. 9 illustrates performing frame selection in accordance with an illustrative embodiment of the present invention in which a heuristic technique is used in combination with the MAD metric.

The lengthening and shortening of sample intervals is performed subject to the constraint that the samples cannot move out of the superframe. The effect of this algorithm is to sample more frequently during rapid changes in the frames, which results in more constant stepsize and quantization noise since the variance in the prediction residuals is more constant among frames. A fixed average frame rate is advantageously maintained since one sample is chosen in each superframe. An example of frame selection using this technique is shown in FIG. 9.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

What is claimed is:

1. A method of coding a video signal, the video signal comprising a sequence of video frames, the sequence of video frames comprising a sequence of subsequences of said video frames, the method comprising the steps of:

determining a coding quality measure for one or more of the video frames comprised in one of said subsequences of said video frames;

selecting a particular one of the video frames comprised in said one of said subsequences of said video frames, the selection based on the coding quality measure therefor; and coding the selected video frame as representative of said one of said subsequences of said video frames.

2. The method of claim 1 wherein each of said subsequences of said video frames comprises a fixed number M of video frames.

3. The method of claim 2 wherein the selection of said particular one of the video frames is further based on a predetermined number of subsequences of said video frames previous to said one of said subsequences of said video frames.

4. The method of claim 3 wherein said predetermined number of subsequences of said video frames previous to said one of said subsequences of said video frames is one.

5. The method of claim 3 wherein the selection of said particular one of the video frames comprises applying the Viterbi Algorithm to a trellis of video frames.

6. The method of claim 1 wherein the coding quality measure is based on a displaced frame difference between said one or more of the video frames and a previous video frame.

7. The method of claim 6 wherein the coding quality measure comprises the power of said displaced frame difference.

8. The method of claim 6 wherein the coding quality measure comprises the power of said displaced frame difference raised to a predetermined power.

9. The method of claim 1 wherein the coding quality measure is based oil a frame difference between said one or more of the video frames and a previous video frame.

10. The method of claim 9 wherein the coding quality measure comprises the power of said frame difference raised to a predetermined power.

11. The method of claim 1 wherein the coding quality measure is based on a mean absolute frame difference between said one or more of the video frames and a previous video frame.

12. The method of claim 11 wherein the coding quality measure comprises the power of said mean absolute frame difference raised to a predetermined power.

13. The method of claim 1 wherein the selection of the particular one of the video frames is based on a sampling interval from a previously selected video frame, and wherein said sampling interval is adjusted based on said coding quality measure.

14. The method of claim 13 wherein the coding quality measure is based on a mean absolute frame difference between said one or more of the video frames and a previous video frame.

15. A system for coding a video signal, the video signal comprising a sequence of video frames, the sequence of video frames comprising a sequence of subsequences of said video frames, the apparatus comprising:

means for determining a coding quality measure for one or more of the video frames comprised in one of said subsequences of said video frames;

means for selecting a particular one of the video frames comprised in said one of said subsequences of said video frames, the selection based on the coding quality measure therefor; and means for coding the selected video frame as representative of said one of said subsequences of said video frames.

16. The system of claim 15 wherein each of said subsequences of said video frames comprises a fixed number M of video frames.

17. The system of claim 16 wherein the selection of said particular one of the video frames is further based on a predetermined number of subsequences of said video frames previous to said one of said subsequences of said video frames.

18. The system of claim 17 wherein said predetermined number of subsequences of said video frames previous to said one of said subsequences of said video frames is one.

19. The system of claim 17 wherein the selection of said particular one of the video frames comprises applying the Viterbi Algorithm to a trellis of video frames.

20. The system of claim 15 wherein the coding quality measure is based on a displaced frame difference between said one or more of the video frames and a previous video frame.

21. The system of claim 20 wherein the coding quality measure comprises the power of said displaced frame difference.

22. The system of claim 20 wherein the coding quality measure comprises the power of said displaced frame difference raised to a predetermined power.

23. The system of claim 15 wherein the coding quality measure is based on a frame difference between said one or more of the video frames and a previous video frame.

24. The system of claim 23 wherein the coding quality measure comprises the power of said frame difference raised to a predetermined power.

25. The system of claim 15 wherein the coding quality measure is based on a mean absolute frame difference between said one or more of the video frames and a previous video frame.

26. The system of claim 25 wherein the coding quality measure comprises the power of said mean absolute frame difference raised to a predetermined power.

27. The system of claim 15 wherein the selection of the particular one of the video frames is based on a sampling interval from a previously selected video frame, and wherein said sampling interval is adjusted based on said coding quality measure.

28. The system of claim 27 wherein the coding quality measure is based on a mean absolute frame difference between said one or more of the video frames and a previous video frame.

* * * * *